United States Patent [19]

Kulczyk

[11] Patent Number: 4,746,144

[45] Date of Patent: May 24, 1988

[54] BREAKAWAY STEERING ASSEMBLY

[75] Inventor: David A. Kulczyk, Torrington, Conn.

[73] Assignee: The Torrington Company, Torrington, Conn.

[21] Appl. No.: 903,942

[22] Filed: Sep. 2, 1986

[51] Int. Cl.$^4$ ............................................. B62D 1/18
[52] U.S. Cl. ..................................... 280/777; 74/492
[58] Field of Search ................. 280/777; 74/492, 493; 403/2, DIG. 4

[56] References Cited

U.S. PATENT DOCUMENTS

| | | | |
|---|---|---|---|
| 3,477,307 | 11/1969 | Maddox | 280/777 |
| 3,600,971 | 8/1971 | Scarvelis et al. | 74/492 |
| 4,411,167 | 10/1983 | Mohr | 280/777 |

FOREIGN PATENT DOCUMENTS

| | | | |
|---|---|---|---|
| 2649962 | 5/1978 | Fed. Rep. of Germany | 74/492 |
| 2491854 | 4/1982 | France | 74/492 |

Primary Examiner—Ross Weaver
Attorney, Agent, or Firm—Frank S. Troidl

[57] ABSTRACT

The breakaway vehicular steering assembly has a tube and a shaft normally operable as a unit. The tube and the shaft are held together by a shearpin which will shear at the application of a predetermined axial force.

A portion of the tube is channelled; the shaft fits within the channel. A ramp extending from the walls of the tube is adapted to move the shaft outwardly from the channel after the shearpin has been broken and the shaft moved axially within the channel and along the ramp. As the shaft moves out from the channel, a metal band innerconnecting the side walls of the channel is broken at a predetermined force and alignment tabs extending outwardly from the tops of the side walls of the channel in the tube are expanded so that the shaft is completely removed from the channel.

3 Claims, 3 Drawing Sheets

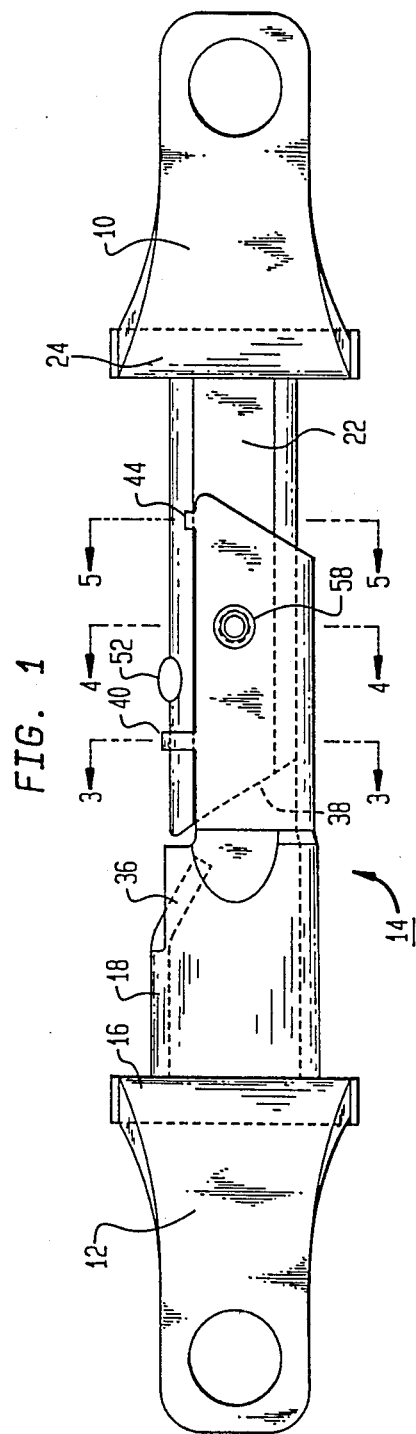
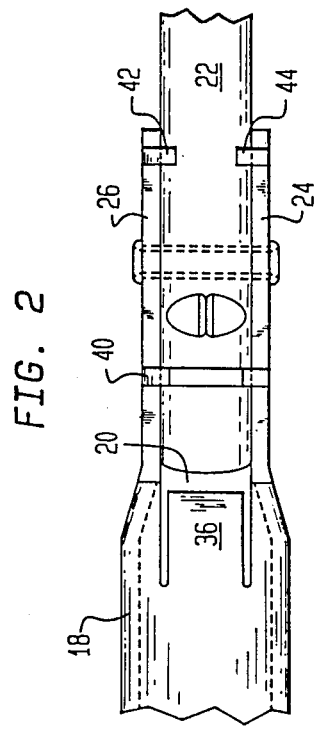
FIG. 1
FIG. 2

BREAKAWAY STEERING ASSEMBLY

This invention relates to breakaway steering assemblies for steering mechanisms used for steering vehicles such as automobiles and trucks. More particularly, this invention is a new breakaway steering assembly requiring fewer parts than currently used breakaway steering assemblies.

In most automobiles and trucks there is a steering shaft connected between the steering wheel and the steering gear. The purpose of the shaft is to transmit the torque applied at the steering wheel to the steering gear thus causing a directional change of the vehicle.

In a front end collision, deformation occurs in the front end of the vehicle which can transmit an axial force along the steering shaft of sufficient magnitude to injure or kill the driver.

The breakaway steering assembly of this invention is constructed so that the steering gear will mechanically separate from the steering shaft to reduce the potential injury to the driver in the event of a front-end collision. Various arrangements are already known which include a breakaway steering assembly. Examples of such arrangements are disclosed in U.S. Pat. No. 3,424,263 issued Jan. 28, 1969 to Enoch Black and entitled "Safety Steering Column" and U.S. Pat. No. 4,411,167 issued Oct. 25, 1983 to John Mohr and entitled "Breakaway Shaft Assembly". The safety steering column shown in the Black patent may have been satisfactory for vehicles of the 1966 era, but is completely unsatisfactory for use in modern day vehicles. The only connection to transmit the torque in the Black patent is a shearpin and this shearpin, if used in modern day vehicles, would no doubt be broken just through normal turning operations without the need for a large axial force caused by a front-end collision. The breakaway shaft assembly disclosed by Mohr is unnecessarily complicated in structure and requires an unnecessarily large number of parts.

This invention is a new and novel breakaway steering assembly which is constructed so that a large torque may be normally applied between the steering wheel and the steering gear without any danger of the breakaway feature operating unless there is a front-end collision of sufficient impact to generate enough axial force to cause the breakaway mechanism to operate. The breakaway feature uses a minimum number of parts.

Briefly described, the breakaway steering assembly comprises a first member having an axially extending enclosing wall forming an enclosed hollow part and a channel formed by walls axially extending from the enclosed part to an axial end of the first member. A second member is located within the channel. A breakable connection between the second member and the channel walls is adapted to normally secure the first member and the second member together for operation as a unit. A deflection mechanism is connected to the enclosing wall of the first member and extends into the channel. The deflection mechanism is adapted to move the second member outwardly from the channel if the breakable connection is broken.

The deflection mechanism is preferably a ramp extending at an acute angle from the enclosing wall and into the channel. The second member is preferably a solid shaft which is normally axially spaced from the ramp. The shaft has the end facing the ramp angled in a direction so that when a breakable connection, such as a shearpin, is broken by the impact of a front-end collision, the shaft will slide within the channel and into engagement with the ramp and then up the ramp and outwardly from the channel.

The shaft is retained in the tube and also kept aligned with the tube by a reinforcing band and alignment tabs. The reinforcement band additionally contributes to torque carrying capability by preventing the walls of the tube from spreading under torsional load.

A projecting member may be provided on the shaft and adapted to fracture the band. In a collision, the shearpin fails at a predetermined load, allowing the shaft to begin sliding into the tube. The angled end of the shaft then contacts the ramp of the tube and begins to drive the shaft out of the tube. This motion puts the reinforcement band into tension until it is fractured by the projecting member on the shaft and also causes the alignment tabs to expand, thus allowing the shaft to leave the tube.

The invention, as well as its many advantages, may be further understood by reference to the following detailed description and drawings in which:

FIG. 1 is an elevational view of a preferred embodiment of the breakaway steering assembly;

FIG. 2 is a fragmentary plan view of the breakaway steering assembly;

Figure 6:
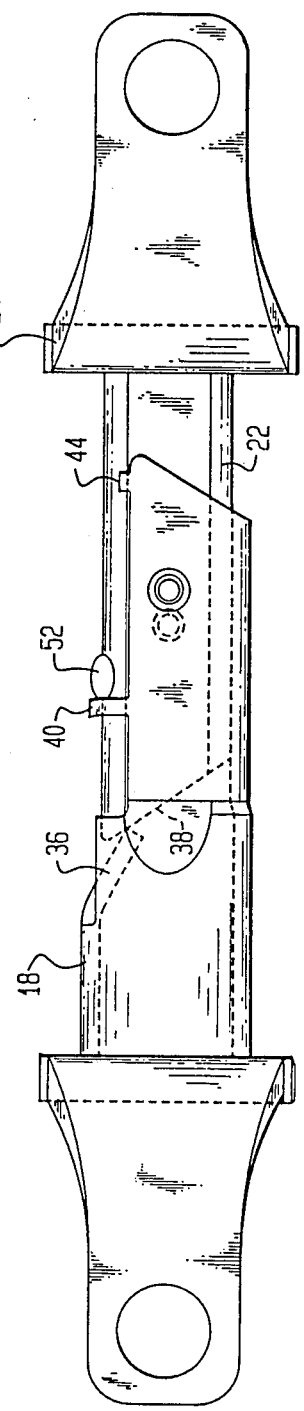
FIG. 6 is a fragmentary elevational view of the breakaway steering assembly of FIG. 1 showing the parts after the shearpin has been broken and the end of the shaft has slid into contact with the ramp.
Figure 7:
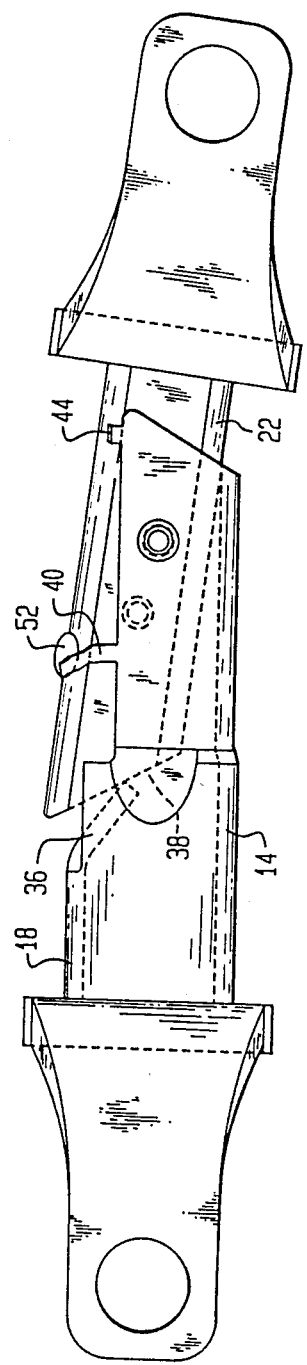
Figure 8:
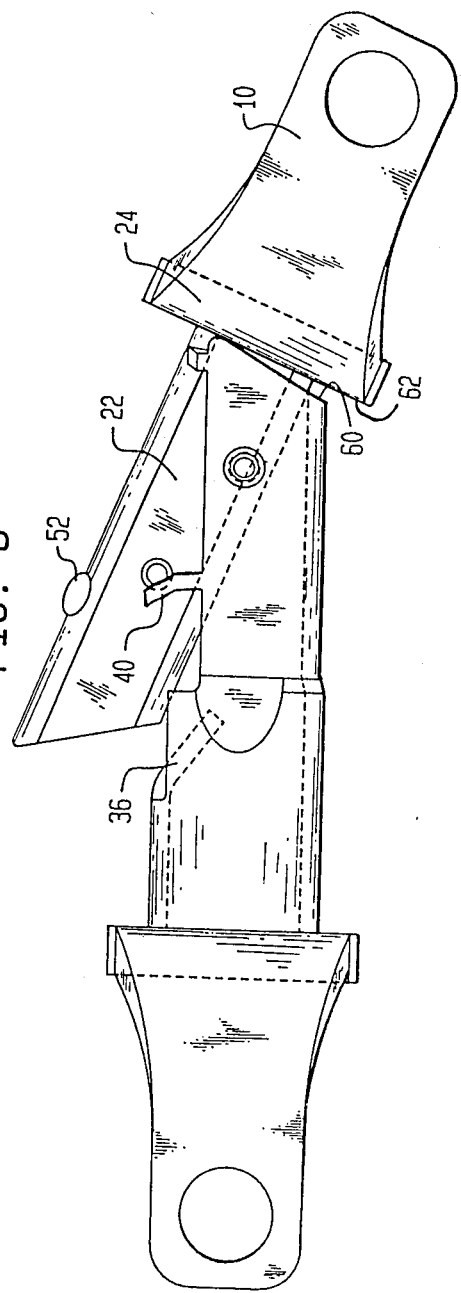

FIG. 7 is a view similar to FIG. 6 showing the positions of the parts after the end of the shaft has pivoted as a result of the riding of the end of the shaft along the ramp and the projection on the shaft has broken the reinforcement band; and FIG. 8 is a view similar to FIG. 6 and FIG. 7 showing the positions of the parts after the shaft has pivoted to a point where the shaft is substantially completely broken away from the tube.

In the various figures, like parts are referred to by like numbers.

Referring to the drawings and more particularly to FIG. 1, the yoke 10 may be connected to a steering shaft (not shown). The yoke 12 may be connected to the gear mechanism (not shown). A single tube 14 extends axially from the flange 16 of the yoke 12. The tube 14 is hollow and has an axially extending enclosing wall 18 of generally O-shaped cross-section extending from the flange 16 of yoke 12. A channel 20 (see FIG. 2) extends axially from the wall 18 to the axial end of the tube 14.

Figure 3:
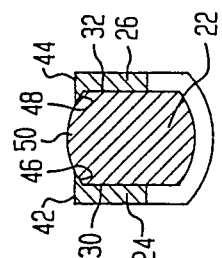
FIG. 3 is a sectional view taken along lines 3—3 of FIG. 1 and in the direction of the arrows.

A solid shaft 22 is connected to the flange 24 of the yoke 10. Shaft 22 extends axially into the channel 20 of the tube 14. As can be seen more clearly from FIG. 3, FIG. 4 and FIG. 5, the channel 20 is formed by walls forming a structure of generally U-shaped cross-section and including the side walls 24 and 26, and bottom wall 28. Note that the sides 30 and 32 of the solid shaft 22 are in tight contact with the inside surfaces of the side walls 24 and 26, respectively of the channel. Also, the bottom surface 34 of the solid shaft 22 is in tight contact with the bottom surface 28 of the channel.

A deflection mechanism in the form of a ramp 36 extends at an acute angle from the wall 18 of the tube into the channel 20. The diameter of the wall 18 of the tube is greater than the diameter of the part of channel 20 which normally receives the shaft 22. During normal operation of the breakaway steering assembly, the angled end 38 of the shaft 22 is axially spaced from the ramp 36. The angle of the end 38 of the shaft is an acute angle and is in a direction such that upon contact of the end 38 of the shaft with the ramp 36 the shaft will begin to move outwardly from the tube 14.

An integral band 40 interconnects the legs 24 and 26 of channel 20. The band 40 is axially spaced a predetermined distance from the ramp 36. If desired, more than one integral band 40 may be used.

Integral alignment tabs 42 and 44 extend inwardly from the tops of legs 24 and 26, respectively, of the U-shaped cross-section. The inside surfaces 46 and 48 (see FIG. 5) of the alignment tabs 42 and 44, respectively, are in contact with a small portion of the top 50 of the shaft 22. The alignment tabs 42 and 44 are constructed to bend radially outwardly upon the application of a predetermined force against the tabs 42 and 44 by the shaft 22. The tabs are located on the tube 14 adjacent the axially open end of the tube and axially spaced a predetermined distance from the integral band 40.

The shaft 22 normally extends into the axial open end of the channel 20 and through the alignment tabs 42 and 44 and through the reinforcement band 40. The axial end 38 of the shaft facing the ramp 36 is normally axially spaced from the ramp as shown in FIG. 1.

Figure 4:
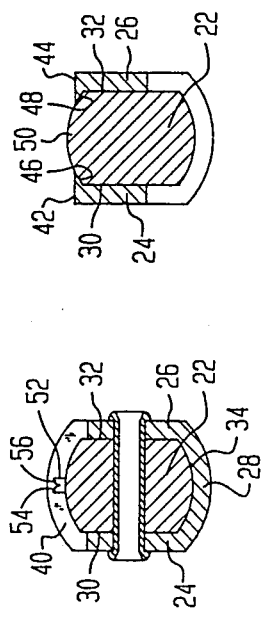
FIG. 4 is a sectional view taken along lines 4—4 of FIG. 1 and in the direction of the arrows.
Figure 5:
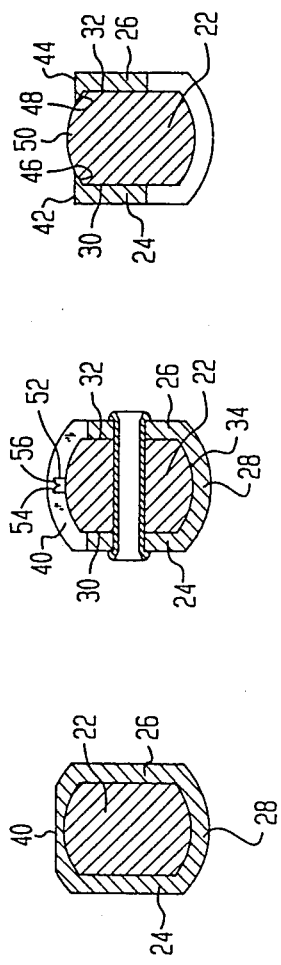
FIG. 5 is a sectional view taken along lines 5—5; of FIG. 1 and in the direction of the arrows.

The shaft 22 has a projection 52 which is normally axially located between the band 40 and the alignment tabs 42 and 44 and is separated from them by predetermined distances. Referring to FIG. 1, FIG. 2, and FIG. 4, it can be seen that the projection 52 has a pair of axially extending sharp curved surfaces 54 and 56.

A breakable member, such as the shearpin 58, is axially normally located between the projection 52 on the shaft 22 and the alignment tabs 42 and 44 on the tube 14. The shearpin 58 extends through the leg 24 of the channel 20, through the shaft 22, and through the other leg 26 of the channel. The shearpin 58 secures the tube 14 and the shaft 22 together so that the tube and shaft will function as a unit during normal operations. However, in a collision, the shearpin 58 will fail at a predetermined axial force.

During normal driving, the yoke 12, tube 14, shaft 22 and yoke 10 function as a single unit of fixed length as held together by the shearpin 58. The reinforcement band 40 and the alignment tabs 42 and 44 aid in retaining the shaft 22 in the tube 14 with the proper alignment. The reinforcement band 40 also contributes to the torque carrying capability by preventing the walls of the tube 14 from spreading under torsional load.

In a collision, the shearpin 58 fails at a predetermined load, causing the tube 14 to move axially until, as shown in FIG. 6, the ramp 36 contacts the angled end 38 of the shaft 22 and the sharp surfaces 54 and 56 of the projection 52 contact the metal band 40. The movement of the end 38 of the shaft 22 along the ramp 36 beings to drive the shaft 22 out of the tube 14. This motion puts the metal band 40 in tension, as shown in FIG. 7, until it is fractured by the projection 52 and also causes the alignment tabs 42 and 44 to bend, thus allowing the shaft 22 to leave the tube 14.

In the embodiment shown, the yoke 10 is very close to the axial open end of the tube 14 to conserve space. Therefore, in order to permit enough pivotal motion of the shaft 22 upon collision, it is necessary to provide an angled end 60, as shown in FIG. 8, which is contacted by the radial surface 62 of the flange 24 as the shaft 22 pivots.

I claim:

1. A breakaway steering assembly comprising: a first member having an axially extending enclosing wall forming an enclosed hollow part and a channel formed by walls axially extending from the enclosed part to an axial end of the first member; a second member within said channel; a breakable connection between the second member and the channel walls adapted to normally secure the first member and the second member together for operation as a unit; a deflection mechanism connected to the enclosing wall of the first member and extending into the channel, said deflection mechanism being adapted to move the second member outwardly from the channel if the breakable connection is broken; an integral alignment tab extending inwardly from the top of each sidewall of the channel and in contact with the top of the second member and adapted normally to keep the second member within the channel and aligned with the channel, said tabs being also adapted to deflect when the second member exerts a predetermined force against the tabs as the second member is moved outwardly by the deflection mechanism after the breakable connection is broken.

2. A breakaway steering assembly comprising: a first member having an axially extending enclosing wall forming an enclosed hollow part and a channel formed by walls axially extending from the enclosed part to an axial end of the first member; a second member within said channel; a breakable connection between the second member and the channel walls adapted to normally secure the first member and the second member together for operation as a unit; a deflection mechanism connected to the enclosing wall of the first member and extending into the channel, said deflection mechanism being adapted to move the second member outwardly from the channel if the breakable connection is broken; an integral band interconnecting the tops of the channel sidewalls forming a second enclosed hollow portion; and a projecting member on the second member normally axially spaced from said band and adapted to fracture said band as the second member is moved outwardly by the deflection mechanism after the breakable connection is broken.

3. A breakaway steering assembly comprising: a single tube having an axially extending portion having a generally O-shaped cross-section, and an axially extending portion of generally U-shaped cross-section integrally connected to the generally O-shaped portion; said tube having a ramp extending at an acute angle from the wall of the generally O-shaped portion into the generally U-shaped portion; an integral band axially spaced from the ramp and interconnecting the legs of the U-shaped portion of the tube forming a second O-shaped portion; an integral alignment tab extending inwardly from the top of each leg of the U-shaped cross-section, the alignment tabs being located adjacent the axial open end of the tube and axially spaced from the band; a single shaft extending into the axial open end of the U-shaped portion of the tube and through said alignment tabs and said band, the axial end of the shaft facing the ramp being normally axially spaced from the ramp and angled in a direction such that upon contact of the angled end of the shaft with the ramp, the shaft will move outwardly from the tube; a projecting member on the shaft normally axially located between the band and the alignment tabs, said projecting member having axially extending sharp surfaces adapted to fracture the band; and a shearpin axially normally located between the projecting member on the shaft and the alignment tabs on the tube, said shearpin extending through one leg of the U-shaped portion of the tube, through the shaft, and through the other leg of the U-shaped portion of the tube whereby normally the tube and shaft function as a unit but in a collision the shearpin fails at a predetermined axial force, the shaft slides further into the tube, the angled end of the shaft moves along the ramp, the projection on the shaft fractures the band, the alignment tabs deflect and the shaft leaves the tube.

* * * * *